United States Patent
Tanaka

(10) Patent No.: US 9,376,742 B2
(45) Date of Patent: Jun. 28, 2016

(54) WEAR-RESISTANT MEMBER MADE OF TITANIUM METAL

(75) Inventor: Shinichi Tanaka, Osaka (JP)

(73) Assignee: TANAKA LIMITED, Osaka (JP)

( * ) Notice: Subject to any disclaimer, the term of this patent is extended or adjusted under 35 U.S.C. 154(b) by 527 days.

(21) Appl. No.: 13/812,531

(22) PCT Filed: Feb. 16, 2011

(86) PCT No.: PCT/JP2011/053246
§ 371 (c)(1),
(2), (4) Date: Jan. 28, 2013

(87) PCT Pub. No.: WO2012/014507
PCT Pub. Date: Feb. 2, 2012

(65) Prior Publication Data
US 2013/0118644 A1     May 16, 2013

(30) Foreign Application Priority Data

Jul. 29, 2010   (JP)   ................. 2010-170707

(51) Int. Cl.
| | |
|---|---|
| C23C 8/20 | (2006.01) |
| B32B 15/04 | (2006.01) |
| C23C 8/80 | (2006.01) |
| C23C 8/36 | (2006.01) |

(52) U.S. Cl.
CPC . *C23C 8/80* (2013.01); *B32B 15/04* (2013.01); *C23C 8/36* (2013.01)

(58) Field of Classification Search
CPC .............. C23C 8/20; C23C 8/36; C23C 8/80; C23C 8/44; C23C 8/64; B32B 15/04
See application file for complete search history.

(56) References Cited

U.S. PATENT DOCUMENTS

| | | | |
|---|---|---|---|
| 5,466,305 A | 11/1995 | Sato et al. | |
| 5,908,671 A | 6/1999 | Tanaka et al. | |

FOREIGN PATENT DOCUMENTS

| | | | | |
|---|---|---|---|---|
| JP | 02-122075 | | 5/1990 | |
| JP | 07-090542 | | 4/1995 | |
| JP | 11-043770 | | 2/1999 | |
| JP | 2000-119842 | | 4/2000 | |
| JP | 2003-129215 | * | 5/2003 | ............... B21H 3/02 |
| JP | 2006-307348 | | 11/2006 | |
| JP | 2008-231520 | | 10/2008 | |

OTHER PUBLICATIONS

International Search Report issued May 17, 2011 in International (PCT) Application No. PCT/JP2011/053246.
Written Opinion of the International Searching Authority issued May 17, 2011 in International (PCT) Application No. PCT/JP2011/053246 (with English translation).

* cited by examiner

*Primary Examiner* — Lois Zheng
(74) *Attorney, Agent, or Firm* — Wenderoth, Lind & Ponack, L.L.P.

(57) ABSTRACT

A wear-resistant titanium metal member includes a substrate having a carburized layer formed by plasma carburizing and a polished surface having a surface roughness Ra of 0.01 to 0.80 μm formed on the surface of the carburized layer, a titanium oxide layer superposed on the polished surface, and an amorphous carbon (GLC) layer superposed on the titanium oxide layer. The GLC layer is rigid and has a flat and smooth surface, so that it is free of stress concentration. By adjusting the plasma carburizing temperature and the concentration of the carburizing gas, carbon ions can penetrate the polished surface and form the carburized layer under the polished surface.

11 Claims, 1 Drawing Sheet

WEAR-RESISTANT MEMBER MADE OF TITANIUM METAL

TECHNICAL FIELD

The present invention relates to a wear-resistant member made of titanium metal which can be in the form of a fastening member such as a threaded member or a sliding member such as a slide bearing, and a method of manufacturing such a wear-resistant member.

BACKGROUND ART

Generally speaking, titanium alloys are higher in strength than pure titanium, and are high in specific strength, fracture toughness, heat resistance and corrosion resistance, and have other excellent properties. Thus titanium alloys have high practical values as materials for aircraft and materials used e.g. in the marine, electric power application and automotive fields.

With an increasing demand for faster and larger aircraft, demand for titanium allows are increasing as materials for primary structural members of aircraft such as outer plating, frames and joint fittings and fastening members (fasteners).

Fasteners such as bolts and nuts are used under harsh conditions where they are repeatedly subjected to various stresses including thermal stress. Because the contact potential difference between titanium alloys and carbon fiber reinforced plastics is small, titanium alloys are less likely to corrode when brought into contact with such plastics. Thus titanium alloys are used as materials of fastening parts (fasteners) such as bolts and nuts for fixing together laminates made of carbon fiber reinforced plastics and forming center wings, main wings and tails of aircraft.

Properties required for such fasteners include predetermined wear resistance as threaded members, and sliding properties in order to ensure necessary tightening torque from the design viewpoint. In order to fulfill these requirements, fastening parts made of titanium alloys have their surfaces subjected to plasma carburizing treatment.

When titanium metal is subjected to plasma carburizing treatment, accelerated activated carbon ions collide against and stick to the surface of the titanium metal, and then diffuse into the titanium metal thereafter. Otherwise, the moment the carbon ions collide against the surface of the titanium metal, they are driven into the titanium metal. In either case, a hard layer of a metal carbide such TiC is formed on the surface of the titanium metal.

Carburizing treatment is performed e.g. by cleaning the surface of titanium metal, and subjecting the titanium metal to plasma carburizing treatment in an atmosphere containing hydrocarbon gas and kept at 0.5 to 15 torr and 700 to 1100° C. so that the titanium metal maintains its inherent strength (see the below-identified Patent document 1).

It is also known, in order to improve the corrosion resistance and the wear resistance, to form a dense film of a titanium oxide on the surface of titanium metal and then subject the surface of the titanium oxide to plasma heat treatment in an atmosphere containing a hydrocarbon gas and kept at 0.1 to 30 torr and 400 to 1100° C., thereby efficiently forming a high-quality glass-like carbon film (see the below-identified Patent document 2).

Glass-like carbon is a non-directional aggregation of hexagonal planes measuring several nanometers, which are basic units of graphite materials. Glass-like carbon is also known as amorphous carbon (or "non-graphitizable carbon") because no graphite structure develops even if heated to around 3000° C.

PRIOR ART DOCUMENTS

Patent Documents

Patent document 1: JP Patent Publication 2909361B
Patent document 2: JP Patent Publication 3347287B

SUMMARY OF THE INVENTION

Object of the Invention

Plasma carburizing treatment at a relatively low temperature as disclosed in Patent document 1 can retain strength inherent to titanium and improves friction/wear properties. A glass-like carbon coating as disclosed in Patent document 2 improves corrosion resistance, wear resistance and lubricity. Thus, each of these two inventions improves tribological properties. But still, each of these inventions cannot provide enough wear resistance under severe sliding wear conditions. Simply combining these two inventions is difficult for the following reasons.

That is, when a dense titanium oxide film is formed on a polished surface of titanium metal, as in Patent document 2, this film prevents penetration of activated carbon ions into the titanium metal (carburization). Thus, while the titanium oxide film makes it easier to form an amorphous carbon layer on the surface of the titanium metal, this film makes it difficult to form a carburized layer under the amorphous carbon layer.

Conversely, if a carburizing layer is formed on a titanium alloy substrate beforehand, in order to form a good-quality amorphous carbon layer thereafter, it is necessary to polish the surface of the carburized layer to a mirror finish. But since the carburized layer is hard, high in wear resistance and low is friction coefficient, it is technically difficult, costly, inefficient, and thus impractical to polish such a carburized layer.

For the above reasons, it was difficult to use titanium alloys as materials for wear-resistant members which can sufficiently withstand severe sliding wear conditions when these members are brought into sliding contact with carbon fiber reinforced plastic members. When titanium alloys were used for fastening members such as nuts and bolts and sliding members such as spherical bearings, too, these members were unable to sufficiently withstand sliding wear due to repeated contact with high-strength fillers such as carbon fibers.

An object of the present invention is to provide a wear-resistant titanium metal member which can be used as a fastening member or a sliding member, which is free of the above problems, of which the wear resistance is further improved so that it can withstand severe sliding wear conditions, and which is less likely to become worn especially under such harsh sliding wear conditions where it is brought into sliding contact with a carbon fiber reinforced plastic material while maintaining high mechanical strength inherent to titanium alloys.

Means to Achieve the Object

In order to achieve this object, the present invention provides a wear-resistant titanium metal member comprising a substrate having a carburized layer formed by plasma carburizing, wherein the carburized layer has a polished surface having a surface roughness Ra (surface roughness arithmetic average) of 0.01 to 0.80 μm, a titanium oxide layer formed by oxidizing the polished surface, and an amorphous carbon (hereinafter sometimes also referred to as "GLC") layer superposed on the titanium oxide layer.

According to the present invention, since the titanium oxide layer having a suitable density is formed on the polished surface formed on the substrate of titanium metal with the above-described predetermined surface roughness, it is possible to form a flat and rigid GLC layer superposed on the titanium oxide layer such that there is no stress concentration. By adjusting the plasma carburizing temperature and the concentration of the carburizing gas, carbon ions can penetrate the polished surface and form the carburized layer under the polished surface.

The rigid and flat GLC layer allows the wear-resistant titanium metal member to be brought into sliding contact with a frictional surface without stress concentration, thus improving wear resistance of the titanium metal member. Also, in cooperation with the carburized layer formed under the polished surface, the GLC layer serves to keep necessary wear resistance of the titanium metal member for a prolonged period of time.

Preferably, the GLC layer has a hardness of 640 mHV or over to ensure sufficient wear resistance of the wear-resistant titanium metal member.

By adjusting the surface roughness Ra of the polished surface within the range of 0.01 to 0.80 μm, the oxide layer has necessary and sufficient smoothness. The smaller the Ra value, the higher the density of the GLC layer and the higher its hardness. But if the Ra value is smaller than the lower limit of the above range, the density of the GLC layer tends to be so high as to excessively block penetration of activated carbon ions, thus making it difficult to carburize the portion of the titanium metal member under the oxide layer no matter how the plasma carburizing conditions are adjusted. If the Ra value is higher than the above range, the GLC layer formed on the polished surface will be so low in density that its hardness will be insufficient.

If the wear-resistant titanium metal member is used as a sliding part adapted to be brought into contact with carbon fiber reinforced synthetic resin (hereinafter abbreviated to "CFRP") parts or titanium metal parts, the titanium metal member is less likely to be damaged by, and is less likely to damage, the CFRP members. The wear-resistant titanium metal member is extremely suitable for use as a fastening member, such as a threaded member, configured to be brought into sliding contact with CFRP members, i.e. a fastening member that has to be reliably fixed in position even while being vibrated, and shows excellent wear resistance.

If the wear-resistant titanium metal member according to the present invention is used as a threaded member (bolt), i.e. as a fastening member, e.g. in the above-mentioned condition, it reliably shows excellent wear resistance.

If this wear-resistant titanium metal member is used as a spherical bearing too, it shows excellent wear resistance while kept in sliding frictional contact with mating members and receiving bearing loads.

The wear-resistant titanium metal member of the invention, having such excellent properties, can be advantageously used as a wear-resistant part for an aircraft, for which an especially high safety standard is required, especially in view of the fact that when this wear-resistant part is used to fasten CFRP members together, which vibrate, this wear-resistant part never damages, or is never damaged by, the CFRP members.

This wear-resistant titanium metal member is preferably manufactured using a method comprising forming a polished surface having a surface roughness Ra of 0.01 to 0.80 μm on a surface of a titanium metal substrate, forming a titanium oxide layer on the polished surface in air, subjecting a surface of the titanium oxide layer to plasma carburizing treatment in an atmospheric gas kept at 350 to 850° C., and forming an amorphous carbon layer superposed on the titanium oxide layer by plasma heat treatment at 400 to 1100°.

Since carbon ions produced by plasma carburizing at a relative low temperature, i.e. 350 to 850° C., can penetrate the titanium oxide layer of the invention, it is possible to form the carburized layer under the titanium oxide layer without reducing the corrosion resistance of the titanium metal. By adjusting the plasma carburizing temperature, which is relatively high, i.e. 400 to 1100° C., and the concentration of the carburizing gas, it is possible to form a good-quality GLC layer on the titanium oxide layer.

Since the GLC layer is formed on the polished surface having a surface roughness Ra of 0.01 to 0.80 μm, it is dense and rigid and is high in wear resistance. The GLC layer also has a flat and smooth surface, so that it is free of stress concentration.

Thus, it is possible to efficiently manufacture a wear-resistant titanium metal member which has improved wear resistance such that it can withstand harsh sliding wear conditions.

Advantages of the Invention

Since the wear-resistant titanium metal member according to the present invention includes a polished surface having a predetermined surface roughness on the plasma carburized layer, a titanium oxide layer superposed on the polished surface, and an amorphous carbon layer superposed on the oxide layer, the titanium metal member shows improved wear resistance such that it can withstand harsh sliding conditions. Even when this titanium metal member is used in harsh sliding conditions where it is brought into sliding contact with carbon fiber reinforced plastic materials, it is less likely to become worn. Thus, when the titanium metal member is used as a fastening member or a sliding member, it shows excellent mechanical strength inherent to a titanium alloy.

By using the method according to the present invention, which includes forming a polished surface having a predetermined surface roughness on the surface of a titanium metal substrate, subjecting the surface of a titanium oxide layer formed on the polished surface to plasma carburizing treatment in an atmospheric gas kept at a temperature within a relatively low predetermined temperature range, and forming an amorphous carbon layer superposed on the titanium oxide layer by plasma heat treatment at a temperature within a relatively high predetermined temperature range, the wear-resistant titanium metal member according to the present invention, which has improved wear resistance such that it can withstand the above-described harsh sliding wear conditions, can be efficiently manufactured.

BEST MODE FOR EMBODYING THE INVENTION

Now description is made of the wear-resistant member made of titanium metal embodying the present invention, and a method of manufacturing this wear-resistant member with reference to the drawings.

Figure 1:
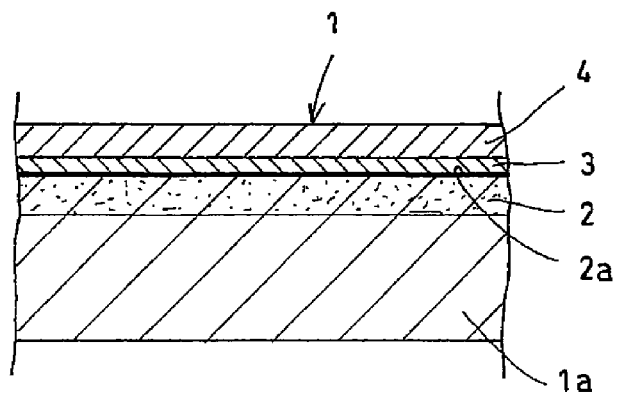
FIG. 1 is an enlarged sectional view of a trunk portion of a wear-resistant titanium metal member according to the present invention.

FIG. 1 shows an enlarged view of a portion of the surface layer of the titanium metal member 1 embodying the present invention, which is a threaded member. The titanium metal member 1 includes a carburized layer 2 formed on the substrate 1a by plasma carburizing and formed with a polished surface 2a having a surface roughness Ra of 0.01 to 0.80 μm, a titanium oxide layer 3 laminated on the polished surface 2a, and an amorphous carbon layer (which is also called the "glass-like carbon (GLC)" layer) 4 laminated on the surface of the titanium oxide layer 3.

To efficiently manufacture this wear-resistant titanium metal member 1, the polished surface 2a, which has a surface roughness Ra of 0.01 to 0.80 μm, is formed on the surface of the substrate 1a of titanium metal, which is a rod-shaped member so that it can be formed into a threaded member, the titanium oxide layer 3 is formed on the polished surface 2a in the air, the surface of the titanium oxide layer 3 is subjected to plasma carburizing in a gas atmosphere at 350 to 850° C. to form the carburized layer 2, and then plasma heat treatment is carried out at 400 to 1100° C. to form the amorphous carbon layer 4 so as to be superposed on the titanium oxide layer 3.

The titanium metal material according to the present invention may be made of pure titanium, a titanium alloy, or an intermetallic compound of titanium and another metal. Preferably, in order to ensure strength as a threaded member, this material is subjected to solid solution treatment and then aging treatment at 480 to 690° C.

As used herein, the term "polish" or "polishing" refers to a step of forming a polished surface having a surface roughness Ra (surface roughness arithmetic average) Ra of 0.01 to 0.80 μm, preferably 0.01 to 0.50 μm, more preferably 0.01 to 0.40 μm, on the above-described titanium metal material.

Because the titanium oxide layer is formed suitably smoothly and densely by air oxidation on this polished surface, which has the above predetermined roughness, the amorphous carbon layer (also known as the "glass-like carbon layer") formed thereon is homogeneous, has a required hardness (e.g. 640 mHV or over), and has a smooth surface. The density of the titanium oxide layer is adjusted such that during the plasma carburizing treatment, activated ionized carbon atoms can penetrate the titanium oxide layer and still, the titanium oxide layer is strongly bonded to the polished surface.

Any known polishing method used to polish metal may be used to form the polished surface. For example, the polished surface may be formed by machining such as buffing, or by chemical polishing. Good results were obtained by buffing using emery paper and alumina suspension or chrome oxide suspension as a polishing agent.

The plasma carburizing treatment was carried out in a vacuum device including a heating furnace in which a treatment chamber is defined by heat insulating members attached to the inner surface of the shell of the furnace. Heating elements in the form of graphite rods are provided in the treatment chamber to heat the treatment chamber.

The heat insulating member at the top of the treatment chamber is electrically conductive and is connected to the anode of a direct current source. A table on which the object to be treated is placed is connected to the cathode of the direct current source. Direct current is applied between the electrodes to generate glow discharge, thereby ionizing a hydrocarbon carburizing gas introduced thorough manifolds provided in the treatment chamber and thus generating activated carbon ions. The activated carbon ions collide against the surface of the object to be treated, thus carburizing the object. A vacuum pump is connected to the treatment chamber to create a vacuum in the treatment chamber.

The hydrocarbon carburizing gas used in the present invention may be any gas consisting only of carbon and hydrogen, and may be either a chain (straight-chain or side-chain) hydrocarbon or a cyclic hydrocarbon. For example, hydrocarbons usable in the invention include methane hydrocarbons such as methane, ethane and propane.

After the aging treatment, the titanium metal material is polished to the above-mentioned predetermined surface roughness so that the oxide film (i.e. titanium oxide layer) can be formed thereon immediately thereafter in the air.

The titanium metal material is then rinsed using an organic solvent or ultrasonic energy. Further, with the titanium metal material placed on the table in the treatment chamber, its surface is cleaned with an inorganic cleaning gas containing hydrogen gas plasmatized by glow discharge, after heating the titanium metal material with the heating element to substantially the same temperature range as the carburizing temperature, i.e. 350 to 850° C.

Since the oxide film forming the titanium oxide layer is dense and has a smooth surface, it is strongly bonded to the polished surface. Thus, the oxide film is never removed by the sputtering action of e.g. argon and hydrogen in the cleaning gas.

After cleaning, propane gas as the carburizing gas, and hydrogen gas as a diluting gas which serves as a cleaning gas are introduced into the treatment chamber, with the flow rate adjusted such that a vacuum of about 10 Pa to 2000 Pa is created in the treatment chamber.

During the carburizing treatment, this mixed gas, i.e. the atmospheric gas is kept at the above-mentioned predetermined temperature range of 350 to 850° C. so that the titanium metal material is kept at the carburizing treatment temperature.

When glow discharge is generated in such atmospheric gas, carbon atoms in the propane gas turn into activated carbon ions. The activated carbon ions thus produced collide against the surface of the titanium alloy material, diffuse into the titanium metal material, and are bonded to Ti, thus forming the sintered layer, i.e. the hardened layer of TiC at its surface portion.

The above carburizing temperature range of 350 to 850° C. is relatively low and substantially overlaps the aging temperature range. This prevents deposits produced during the aging treatment from aggregating and growing during carburizing, thereby reducing tensile strength, shear strength and fatigue strength or otherwise deteriorating the quality of the material. Also, since the carburizing temperature is relatively low, it is possible to easily reduce the thickness of the hardened layer of TiC to a level where the slide properties improves, e.g. to about 10 μm, or even to 1 μm or less.

The amorphous carbon layer is formed as follows.

The hydrocarbon gas pressure during the plasma heat treatment is preferably kept at 13 to 4000 Pa. At this pressure range, a mainly amorphous carbon (glass-like carbon) film can be efficiently formed on the surface of the titanium metal. If this pressure is less than 13 Pa, the carbon film does not sufficiently grow due to insufficient supply of carbon. Use of a pressure higher than 4000 Pa is not practical. In view of this, the hydrocarbon gas pressure is more preferably kept at 13 to 2666 Pa.

The atmospheric temperature during the plasma heat treatment for forming the amorphous carbon layer is preferably 400 to 1100° C., more preferably 500 to 1100° C., and further more preferably 530 to 1100° C. If lower than this range, the glass-like carbon cannot be bonded to the surface of the titanium metal with sufficient strength. A temperature higher than the above temperature range is not practical, if only for the reason that it is difficult to maintain sufficient strength of titanium.

After the plasma carburizing treatment and the plasma heat treatment for forming the amorphous carbon layer, carburizing gas in the treatment chamber is exhausted, and then nitrogen gas is introduced into the treatment chamber to cool down the titanium alloy material to normal temperature. The thus cooled titanium alloy material is taken out of the treatment chamber.

The bolt blank thus formed is reheated to 150 to 350° C. in an atmosphere of an inert gas such as argon, in a heating device provided adjacent to the plasma carburizing device, and is supplied soon thereafter to a known thread rolling device such as thread rolling flat dies or cylindrical dies to form a thread on the blank by rolling, preferably at a temperature of 150 to 350° C.

Immediately after forming the thread, the titanium metal member is put in a cylindrical container filled with inert gas and cooled slowly to prevent cracking during cooling.

The wear-resistant titanium metal member may be a fastening member in the form of a threaded member, or a fastening part of a portion of a fastening part, such as a pin, a rivet-shaped part, a clip or a washer.

Also, the wear-resistant titanium metal member may be a member having a sliding surface, such as a spherical bearing, or any other know sliding member such as a pin, a collar or a roller.

The wear-resistant titanium metal member according to this invention can be most advantageously used as a wear-resistant part of an aircraft, because the wear-resistant titanium metal member of the invention has everything required for wear-resistant parts of aircraft.

EXAMPLES

Example 1 and Comparative Examples 1 and 2

Figure 2:
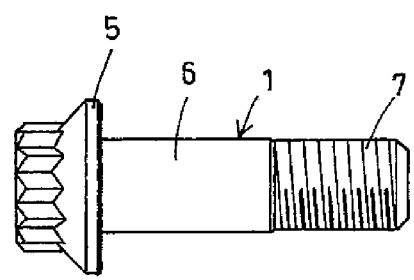
FIG. 2 is a front view of a threaded member embodying the present invention.
Figure 3:
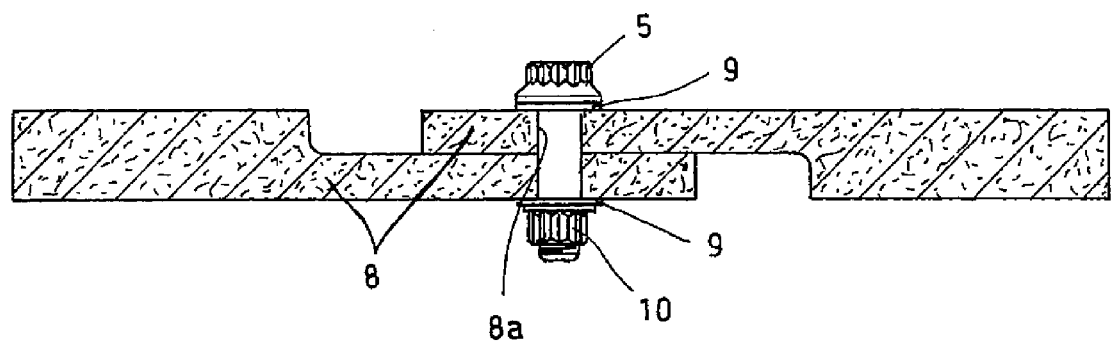
FIG. 3 is a sectional view of a sample piece used in a coupling tensile test.

As shown in FIG. 2, on each of a plurality of the titanium metal members 1 according to the embodiment of the invention, which are made of Ti-6Al-4V, and which are in the form of bolt blanks, a head 5 (for a 12 point (or double hex) bolt) was formed by hot forging. Then, after subjecting the entire bolt to solution treatment, a shank 6 was formed by cutting.

The surface of the shank was polished to a surface roughness Ra in the range of 0.01 μm or over and 0.80 μm or under. Then, after subjecting the bolt to aging treatment at 480 to 690° C., the titanium oxide layer was formed by exposing the bolt to the air. After subjecting the surface of the titanium oxide layer to plasma carburizing treatment in an atmospheric gas kept at 400 to 500° C. in a vacuum device, the amorphous carbon layer was formed so as to be superposed on the titanium oxide layer by plasma heat treatment at 530 to 800° C. Then, hydrogen was eliminated (by baking) in the same vacuum device, and fillet rolled and the thread 7 was formed by rolling. Further, the bolt was lubricated by applying e.g. cetyl alcohol. Titanium alloy bolts were thus obtained as test samples of wear-resistant metal members (Example 1).

As Comparative Example 1, titanium alloy bolts were prepared in exactly the same manner as in Example 1 except that no plasma heat treatment was performed so that the GLC layer was not used with only the carburized layer formed. As Comparative Example 2, titanium alloy bolts were prepared in the same manner as in Example 1 except that neither the plasma carburizing treatment nor the plasma heat treatment of Example was performed. The below-described coupling fatigue test was performed on the titanium alloy bolts of Example 1 and Comparative Examples 1 and 2.

[Coupling Fatigue Test]

Under MIL-HANDBOOK-17-1F, pairs of carbon fiber reinforced epoxy resin (CFRP) plates 8 for aerospace (or aircraft) were prepared. Ends of each pair of plates 8 formed with bolt holes 8a were superposed on each other, and the ends were fastened together using one of the bolts of Example 1 and washers 9 and a nut 10 which were made of the same material and formed in the same manner as the bolts of Example 1 to form couplings. Similar couplings were formed using the respective bolts of Comparative Examples 1 and 2 and corresponding washers 9 and nuts 10. Stress was repeatedly applied to the respective couplings by repeatedly applying tensile and compressive loads.

Specifically, a tensile load of 50% of the maximum tensile load and a compressive load of −20% of the maximum tensile load were alternately applied to the respective couplings up to 10 million times.

Couplings which were not destroyed due to fatigue under the 10 million stress loads were disassembled to check any damage to portions where the two CFRP plates were joined together as well as damage to the respective bolts.

For any of the couplings, the bolt holes of the CFRP plates and the surrounding areas were scarcely damaged. But many circumferentially extending deep scars were found on the trunks of the bolts of Comparative Examples 1 and 2.

On the other hand, the bolts of Comparative Example 1 were practically damage-free, except some very slight abrasions.

The results of Raman spectroscopic analysis on the bolts of Example 1 indicate that the hard (700 mHV) amorphous carbon layer served to protect the shanks of the bolts, minimizing damage.

Another test was performed which were exactly the same as the above mentioned test, except that one of the two CFRP plates of each coupling was replaced with a titanium metal plate made of Ti-6Al-4V and having all the features of the titanium metal member according to the present invention. In this test too, the bolts of Example 1 were practically damage-free except for very slight abrasions, while many circumferentially extending deep scars were observed on the trunks of the bolts of Comparative Examples 1 and 2.

DESCRIPTION OF THE DRAWINGS

1. Titanium metal member
1a. Substrate
2. Carburized layer
2a. Polished surface
3. Titanium oxide layer
4. Amorphous carbon layer
5. Bolt head
6. Bolt shank
7. Bolt thread
8. Carbon fiber reinforced epoxy resin plate
8a. Bolt hole
9. Washer
10. Nut

What is claimed is:

1. A method of manufacturing a wear-resistant titanium metal member, comprising
   forming a polished surface having a surface roughness Ra of 0.01 to 0.80 μm on a surface of a titanium metal substrate,
   forming a titanium oxide layer on the polished surface in air, subjecting a surface of the titanium oxide layer to plasma carburizing treatment in an atmospheric gas kept at 350 to 850° C. to form a carburized layer under the polished surface, and forming an amorphous carbon layer superposed on the titanium oxide layer by plasma heat treatment at 400 to 1100° C.

2. The method of claim 1, wherein the titanium metal substrate is a titanium rod-shaped member.

3. The method of claim 1, wherein the atmospheric gas is a mixture of propane and hydrogen.

4. The method of claim 1, wherein the amorphous carbon layer has a hardness of 640 mHV or more.

5. The method of claim 4, wherein the amorphous carbon layer has a hardness of 700 mHV.

6. The method of claim 1, wherein the plasma heat treatment is conducted at 500 to 1100° C.

7. The method of claim 1, wherein the plasma heat treatment is conducted at 530 to 1100° C.

8. The method of claim 1, further comprising cooling the wear-resistant titanium metal member in nitrogen gas.

9. The method of claim 1, further comprising subjecting the titanium metal substrate to solid solution treatment, and then aging treatment at 480 to 690° C.

10. The method of claim 1, wherein the carburized layer has a thickness of 10 μm or less.

11. The method of claim 1, wherein the carburized layer has a thickness of 1 μm or less.

* * * * *